Figure 1:
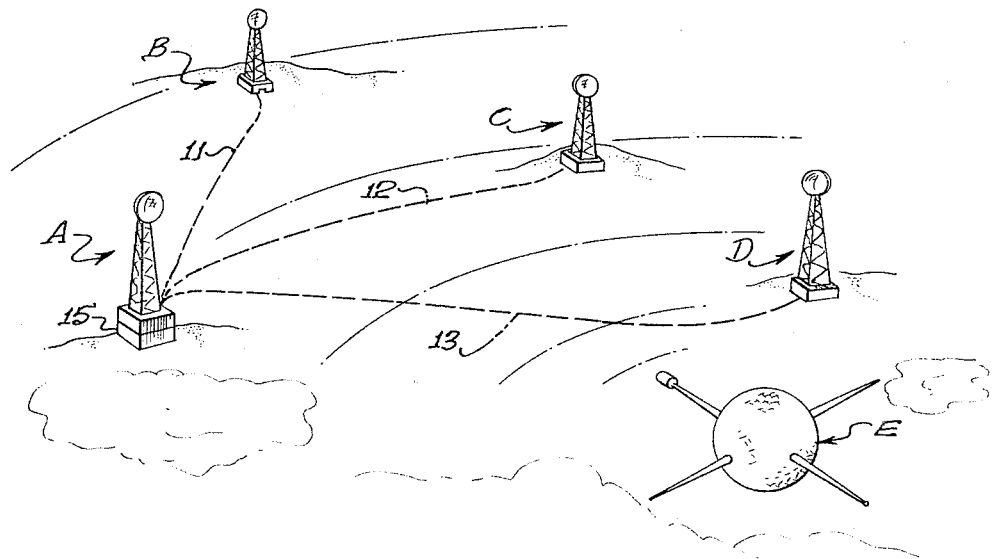

Sept. 6, 1966  A. B. LEES  3,271,770

ANTENNA PHASING CONTROL SYSTEM

Filed July 8, 1963

ALAN B. LEES,
INVENTOR.

BY HIS ATTORNEYS.

Spensley & Horn

United States Patent Office 3,271,770
Patented Sept. 6, 1966

3,271,770
ANTENNA PHASING CONTROL SYSTEM
Alan B. Lees, Canoga Park, Calif., assignor to Electronic Specialty Co., Los Angeles, Calif., a corporation of California
Filed July 8, 1963, Ser. No. 293,328
7 Claims. (Cl. 343—100)

This invention relates to the focusing of radio frequency energy radiated by an array of antennas and more particularly to a technique for maintaining the radio frequency energy radiated by individual antennas in an array of antennas in a predetermined phase relationship with a signal received by the array.

A signal wave front approaching a dispersed array of antennas from an angle will impinge on the nearer antennas in the array before it impinges on the farther antennas, thereby giving rise to a relative phase difference in the signal as it appears to the different antennas in the array. More specifically, if a radio frequency signal of a frequency $f$ and zero phase (indicated by the reference notation $f \angle 0$) is radiated from a target point a distance $R_i$ from the $i$th antenna in an array, the signal will be received by the $i$th antenna as $f \angle -kR_i$, where $k=2\pi f/c$, $c$ being the free space velocity of the radiation. It thus becomes apparent that if it is desired to radiate a signal from the array to the target point and each antenna in the array simultaneously emits an identical signal, the total energy radiated by the array will not be focused on the target point because the identically radiated signals will not all be in phase as they arrive at the target point. However, if each antenna in the array transmits the phase conjugate of its received signal, $f \angle +kR_i$ for the $i$th antenna for example, the signal radiated by each antenna will arrive at the target point as $f \angle 0$. Thus, the radiated waves combine in phase to focus radiation on the target point. This principle is commonly referred to in the art as "coherent focusing."

Coherent focusing can be utilized to increase the effective power of a dispersed pulse radar system, the phases of the received pulses at each antenna being used to control the phases of the retransmitted pulses. The coherent focusing principle can also be employed in continuous-wave radar by using the phase of the received C.W. wave to control the phase of the transmitted waves. Furthermore, the coherent focusing principle can be used to increase the effective power of a dispersed communcation system by using the phase of the received signals at the various antenna sites of one complex to control the transmitted signal phases to focus energy on another complex.

The coherent focusing principle holds particular promise for use in the tracking of and communication with satellites, the antenna array being dispersed over the earth's surface and the remote target point being a satellite in space. At the present state of the art there are very few known systems for achieving coherent focusing, and the few known systems are relatively complex and hence quite bulky, expensive and difficult to adjust and maintain. The more complex an electronic system is, the more components and circuits there are to malfunction and so the greater the likelihood of reduced reliability. The present invention is directed toward an electronic phasing system for achieving coherent focusing, the system being characterized by relative simplicity and high reliability. Furthermore, the present invention phase control circuitry is very compact and inexpensive.

Accordingly, it is an object of the present invention to provide an improved electronic system for focusing energy radiated by an array of antennas on the source of a signal received by the array.

It is also an object of the present invention to provide an improved electronic system for focusing energy radiated by an array of antennas on the source of a received signal by maintaining the energy radiated by individual antennas in the array in phase conjugate relationship with the received signal as it appeared to that individual antenna.

It is another object of the present invention to provide an improved electronic system for establishing a phase conjugate relationship between received and transmitted signals within a dispersed array of antennas.

It is a further object of the present invention to provide improved means for adjusting the relative phasing of electrical energy applied to individual antennas in a dispersed array of antennas.

It is yet another object of the present invention to provide means for adjusting the relative phasing of electrical energy applied to individual antennas in an array of antennas in accordance with the phase conjugate of signals received by the individual antennas.

It is still another object of the present invention to provide a relatively simple electronic system for the coherent focusing of energy radiated by an array of antennas, the system being characterized by high reliability.

It is also an object of the present invention to provide compact and relatively inexpensive circuitry for maintaining the energy radiated by an antenna in phase conjugate relationship with signals received by the antenna.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

The desired object of establishing a phase conjugate relationship between received and transmitted signals within a dispersed array of antennas is accomplished, in accordance with the present invention concepts, by utilization of the superheterodyne principle. Each antenna in the array is coupled to a separate unit for transmitting and receiving on a predetermined radio frequency. First and second reference signals are generated, the first reference signal being of the predetermined radio frequency, the second reference signal being of a predetermined intermediate frequency and of a fixed phase with respect to the first reference signal. The two reference signals are combined to create upper and lower sidebands. Each unit is provided with IF signal component producing means for heterodyning the upper sideband of the combined reference signals with the received signal as it appears to the associated antenna to thereby produce an IF first signal component, and to heterodyne the lower sideband of the combined reference signals with the RF signal generated in that unit to thereby produce an IF second signal component. The phasing of the radio frequency generating means of each unit is altered by phasing control means in that unit which varies the frequency of the RF generating means in accordance with differences in phase between the IF first and second signal components produced in that unit to thereby maintain the energy radiated by the associated antenna in phase conjugate relationship with the received signal as it appeared to that particular antenna.

In the presently preferred embodiment of apparatus suitable for performance of the present invention, the first and second reference signals are produced by master oscillator located at a master control station, and the reference signals are fed from the master control station to each antenna site in the array. The transmitting and receiving unit at each antenna site is provided with a double sideband balanced modulator for combining the first and second reference signals and producing upper and lower sideband outputs. Each unit is also provided with first and second frequency converters, the first frequency converter producing the IF first signal component, and the second frequency converter producing the IF second signal component. The IF first and second signal components are combined in a phase discriminator, the output of which is coupled through a band pass filter to the RF oscillator in the transmitter of that unit.

Figure 2:
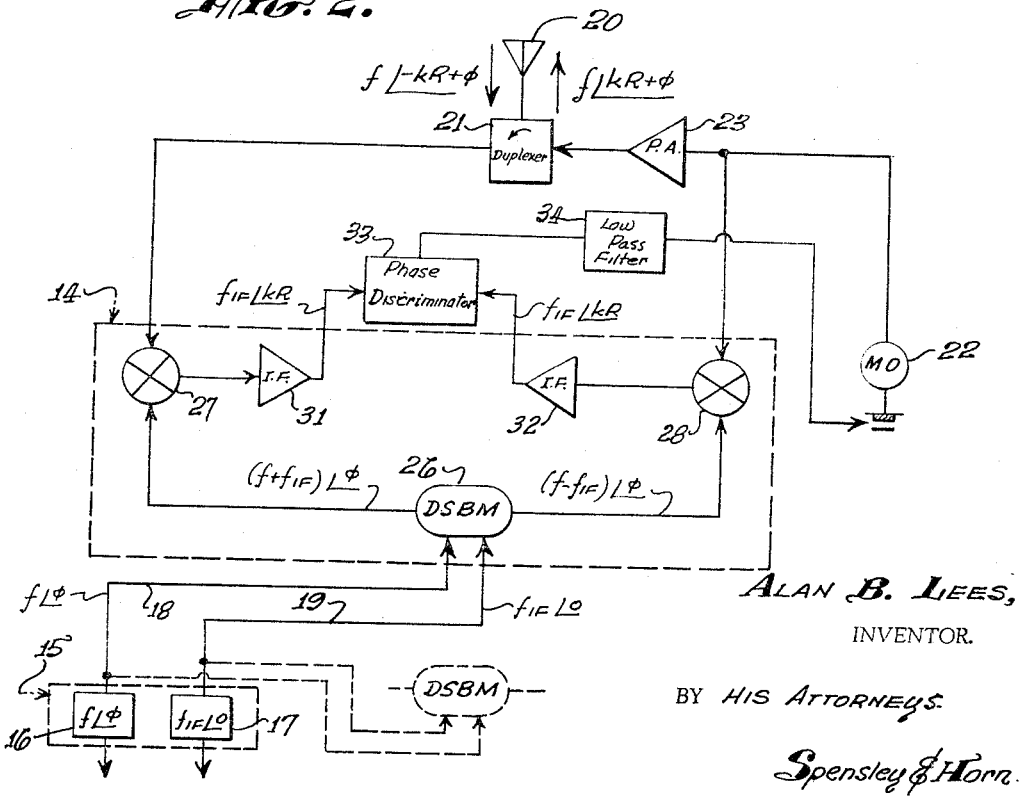

In the drawing:

FIGURE 1 is a pictorial view of a dispersed array of antennas receiving a signal from a remote point; and, FIGURE 2 is a schematic diagram of the presently preferred embodiment of the phasing system employed at the individual antennas in the array of FIGURE 1.

Turning now to the drawing, there is shown in FIGURE 1 a pictorial view of a dispersed array of four microwave antennas receiving a signal from a satellite in space. Although this illustrated embodiment pertains to microwave communication with a satellite in space, the present invention concepts are equally applicable for use at any radio frequency and with any type of remote RF signal source or reflective target. The four antenna sites in the array are generally indicated by the reference characters A, B, C, and D, with the antenna site A being the master control center. Each of the four antenna sites effectively comprises a radio station including an antenna and a transmitting and receiving unit coupled thereto. The transmitting and receiving units at all of the antenna sites are adjusted for operation on the same microwave frequency, about 10,000 megacycles for example. Operation of the unit at the antenna sites B, C and D is controlled from the antenna site A through interconnecting electrical control cables 11, 12 and 13, indicated by the dotted lines in FIGURE 1. Although the illustrated embodiment utilizes control cables, other control means such as a microwave link or a microwave modulated optical link, for example, are also suitable.

FIGURE 1 shows the array receiving signals from a satellite E, the propagation of radio waves from the antenna of the satellite E being generally indicated by dot-dash lines. It is readily seen that a wave front emitted from satellite E will arrive at the antenna site D prior to its arrival at the rest of the sites in the array, and will arrive lastly at the antenna site B. In the array of antennas shown in FIGURE 1, a maximum phase difference in a signal received from satellite E will appear between the sites B and D. Hence, the proper phase difference between the individual antennas in the array must be created in order to insure that energy radiated by the array will be focused on the satellite E.

In FIGURE 2 of the drawing, there is shown a schematic diagram, in block form, of a presently preferred embodiment of apparatus suitable for use in the units at each of the antenna sites of FIGURE 1. To aid in the explanation of the operation of the circuitry, various portions of the circuitry are labeled to indicate the signals passing therethrough, assuming that a signal $F \angle -kR+\phi$ is received by the antenna 20. The antenna 20 may be of the type utilizing the same element or elements for both transmitting and receiving, or depending upon the degree of isolation needed between transmitted and received signals, may be of the type utilizing separate transmitting and receiving elements, i.e., a transmitting antenna and a receiving antenna. The antenna 20 is coupled to its associated unit by means of a duplexer 21, such as a T-R switch or a directional coupler, for example. The transmitter of each unit includes a master oscillator 22, the oscillation frequency of which is electrically controllable. The oscillator 22 is preferably a voltage controlled oscillator, and is coupled to a phase stable RF power amplifier 23, the power amplifier being connected to the antenna 20 by the duplexer 21. The various circuit components indicated in the block diagram of FIGURE 2 such as master oscillators, power amplifiers and duplexers, are well known in the art and hence will not be discussed in detail. Suitable types of components will become apparent to those skilled in the art upon explanation of their various functions.

Contained within the unit at the master control center A are suitable oscillators to generate two reference signals which are maintained in a fixed phase relationship and fed to all of the units in the array. The reference oscillators are shown within a dashed-line enclosure 15 indicating disposition at the master control station A, the reference oscillators being identified by the reference numerals 16 and 17. The output of the reference oscillator 17 is arbitrarily chosen as zero phase reference. The reference oscillator 16 generates a first reference signal of the communication frequency $f$ and of a fixed phase $\phi$. Since the communication frequency $f$ is a microwave frequency on the order of 10,000 megacycles, the reference oscillator 16 can be of the Klystron type, for example. The reference oscillator 17 generates the second reference signal $f_{IF} \angle 0$, the second reference signal being of a predetermined intermediate frequency and zero phase. Thus, a phase difference of $\phi$ is provided between the signals of the oscillators 16 and 17. An IF frequency on the order of 30 megacycles is used in the illustrated embodiment, primarily because oscillators at this frequency are relatively simple and inexpensive, the IF frequency not being critical.

The first and second reference signals are coupled to suitable signal combining means in each of the units, the signal combining means producing two outputs in accordance with the sum and difference of the frequencies of two input signals. The outputs of the reference oscillators 16 and 17 are coupled to the illustrated unit by respective electrical leads 18 and 19, the additional dotted lines extending from the leads 18 and 19 indicating electrical leads coupling the oscillator outputs to the various other units at the other antenna sites. These electrical leads are contained within the interconnecting cables 11–13, with the exception of the leads connecting the reference oscillator outputs to the unit at the master control station. As hereinabove indicated, the reference signals can be coupled to the various antenna sites by microwave or optical links, instead of by electrical leads. Other suitable methods for providing each of the antenna sites in the array with the identical phase-locked reference signals will become apparent to those skilled in the art.

In the illustrated embodiment, the signal combining means are double sideband balanced modulators, the double sideband balanced modulator of the illustrated unit being indicated by the reference numeral 26. Thus, the two signals fed into the double sideband balanced modulator 26 are $f \angle \phi$ and $f_{IF} \angle 0$, the outputs of the double sideband balanced modulator 26 being the upper and lower sidebands of the combined reference signals. The upper sideband $(f+f_{IF}) \angle \phi$ is heterodyned with the received signal $f \angle -kR+\phi$ in a first frequency converter 27 to produce an IF first signal component. The lower sideband $(f-f_{IF}) \angle \phi$ is heterodyned with the output of the master oscillator 22 in a second frequency converter 28 to produce an IF second signal component. The double sideband balanced modulator 26 and the frequency converters 27 and 28 form the main portion of the aforesaid IF signal component producing means (indicated by the dashed-line enclosure 14 in FIGURE 2), and acting in conjunction with the reference oscillators 16 and 17 provide two IF signal components in each of the units, the IF signal components in each unit being dependent upon the RF energy generated within that unit and upon the signal as it appeared to the antenna associated with that unit.

The IF first and second signal components are amplified respectively by IF amplifiers 31 and 32 and compared in a phase discriminator 33. The output of the phase discriminator 33 is coupled to a low pass filter and hold circuit 34 to provide a control voltage for the master oscillator 22. Voltage controlled oscillators suitable for use as the master oscillator 22 typically utilize a voltage variable capacitor (or inductor) in the frequency determining portion of the circuit, variations in a control voltage supplied to the capacitor (or inductor) causing variations in the frequency of the oscillator. In the illustrated embodiment, the control voltage is provided by the output of the low pass filter and hold circuit 34.

Since the received signal is $f\angle -kR+\phi$, it is desired that the transmitted signal be $f\angle kR+\phi$, i.e., the phase conjugate of the received signal. When the master oscillator 22 produces this desired phase conjugate signal, this signal when heterodyned with the lower sideband from the double sideband balanced modulator 26 in the frequency converter 28 will provide an IF second signal component $f_{IF}\angle kR$. The IF first signal component, produced in the frequency converter 27 by heterodyning the received signal with the upper sideband output of the double sideband balanced modulator, is also $f_{IF}\angle kR$. Under these conditions, the output of the phase discriminator 33 will be zero and no control voltage will be applied to the master oscillator 22 to change its relative phasing by altering its frequency. However, if the master oscillator 22 does not produce the phase conjugate of the received signal then the IF second signal component, produced by heterodyning the master oscillator output with the lower sideband output of the double sideband balanced modulator, will no longer correspond to the IF first signal component. Hence, the two inputs to the phase discriminator 33 will no longer be equal and the phase discriminator will provide an output which will be applied to the master oscillator 22 in the form of a control voltage to alter the frequency and phasing of the master oscillator in the proper direction to bring the RF output of the master oscillator back into phase conjugate relationship with the received signal. Thus, the circuit of FIGURE 2 operates generally as a closed loop servo system driven to a null balance. By providing the units at each of the antenna sites in the array with such a servo system, the energy radiated by each antenna in the array will be the phase conjugate of the received signal as it appeared to that antenna, thereby focusing energy radiated by the array onto the source of the received signal.

In the illustrated embodiment, only one each of the reference oscillators 16 and 17 are provided for the entire antenna array, these oscillators being located at the master control antenna site A. Thus, the dotted enclosure 15 of FIGURE 2, containing the oscillators 16 and 17, is physically located at the antenna site A in FIGURE 1, the output of these reference oscillators being supplied through the connecting cables 11–13 to the other antenna sites in the array. Of course, the two reference signals can be combined at the master control station and the upper and lower sideband outputs individually supplied to each of the units, if desired. Other methods of phase locking the two signals provided at each of the antenna sites will become apparent to those skilled in the art in view of the present invention concepts.

For the simplest case in which there is no relative motion between the target point and the antenna array, the reference phase $\phi$ can be arbitrarily selected. However, if the path link between the receiving (or reflecting) target point and the antenna array is changing, the frequency of the received and transmitted signals will differ by a Doppler frequency which is different for each antenna in the array. In such a case, the phase function should be selected so that its rate of change is equal to about minus one-half of the mean Doppler shift for the entire array (approximately minus one-half of the Doppler shift near the mean or mid point of the array). Then the RF generator supplying each transmitted signal must only be pulled in frequency over a differential range of Doppler frequencies in order to maintain the desired phase conjugate relationship between received and transmitted signals. Thus, the Doppler effect is largely compensated for by adjustment of the reference phase, any remaining small error being compensated for by automatic adjustment of the phasing of the RF oscillator in each of the transmitting units.

Thus, there has been described a novel technique for maintaining radio frequency energy radiated by individual antennas focused on a source of a received or reflected signal by maintaining a phase conjugate relationship between received and transmitted signals. The present invention technique utilizes a superheterodyne system incorporating a closed servo loop driven to a null balance. When the energy radiated by a particular antenna is not in phase conjugate relationship with signals received by that antenna an error signal is developed within the servo loop, the error signal increasing with increasing phase difference. Hence, the present invention is especially advantageous for use in radar systems wherein the received signals were originally transmitted from the same antenna array, the error signals in this case being about twice the magnitude of the error signals which would be obtained if the received signals originated from the target point, thereby resulting in quicker null balancing and more stabilized operation. Throughout the preceding discussion, and in the following claims, reference to the source of the received signal is intended to mean the point from which the received signal is directed to the antenna array of the present invention system, and is not intended to be interpreted as referring solely to the point from which the received signal was originally radiated. Hence, in radar applications the "source" of the received signal is the reflecting object which redirects back to the antenna array an RF signal originally radiated by the array.

The hereinabove mentioned transmitting and receiving means can be of the so-called transceiver type or can be of a type utilizing separate transmitting and receiving equipment. Those skilled in the art will appreciate that apparatus embodying the hereinabove disclosed system concepts may be formulated using various combinations of electronic circuitry other than that of the illustrated embodiment to form the IF signal component producing means and the phasing control means. Hence, although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed. For example, by introduction of an additional phase shift within the present invention circuitry, relationships other than the illustrated phase conjugate relationship can be established.

What is claimed is:
1. In radio-frequency communication apparatus including an antenna coupled to means for transmitting and receiving radio-frequency signals, said apparatus including a system for maintaining radio-frequency signals radiated by said antenna in a predetermined phase relationship with a radio-frequency signal received by said antenna, said system comprising, in combination:
 (a) means for generating radio-frequency signals coupled to said antenna;
 (b) intermediate-frequency signal component producing means coupled to said antenna for heterodyning said received signal with a signal of a predetermined fixed phase and a frequency which is the sum of the received signal frequency and a predetermined intermediate frequency to thereby produce an intermediate-frequency first signal component, and for heterodyning the output of said means for generating radio-frequency signals with a signal of said predetermined fixed phase and a frequency which is the difference between said received signal frequency and said predetermined intermediate frequency to thereby produce an intermediate-frequency second signal component, and, (c) phasing control means intercoupling said intermediate-frequency signal component producing means and said means for generating radio-frequency signals to alter the phasing of the signals generated by said last-mentioned means in accordance with differences in phase between said intermediate-frequency first and second signal components produced by said signal component producing means to maintain the signals radiated by said antenna in said predetermined phase relationship with said received radio-frequency signal.

2. In radio-frequency communication apparatus including an antenna coupled to means for transmitting and receiving signals on a predetermined radio frequency, said apparatus including a system for focusing radio-frequency signals radiated by said antenna onto the source of the radio-frequency signal received by said antenna, said system comprising, in combination:

(a) means for generating radio-frequency signals coupled to said antenna;

(b) intermediate-frequency signal component producing means coupled to said antenna for heterodyning said received signal with a signal of a predetermined fixed phase and a frequency which is the sum of said predetermined radio frequency and a predetermined intermediate frequency to thereby produce an intermediate-frequency first signal component, and for heterodyning the output of said means for generating radio-frequency signals with a signal of said predetermined fixed phase and a frequency which is the difference between said predetermined radio frequency and said predetermined intermediate frequency to thereby produce an intermediate-frequency second signal component; and, (c) phasing control means coupled to said intermediate-frequency signal component producing means for producing an electrical output which varies in accordance with differences in phase between said intermediate-frequency first and second signal components, the electrical output of said phasing control means being coupled to said means for generating radio-frequency signals to control the frequency of signals generated by said last-mentioned means to maintain the signals radiated by said antenna in phase conjugate relationship with said received signal.

3. In a dispersed array of antennas in which each antenna is coupled to a separate unit containing means for transmitting and receiving radio-frequency signals, a system for maintaining radio-frequency signals radiated by each of the antennas in said array in a predetermined phase relationship respectively with a radio-frequency signal, which signal is received by each of the antennas in said array, said system comprising, in combination:

(a) means for generating radio-frequency signals for each of said units, each of said means being coupled to the antenna associated with that unit;

(b) intermediate-frequency signal component producing means for each of said units, each of said signal component producing means being coupled to the antenna associated with that unit for heterodyning said received signal as it appears to the associated antenna with a signal of a predetermined fixed phase and a frequency which is the sum of the received signal frequency and a predetermined intermediate frequency to thereby produce an intermediate-frequency first signal component, and for heterodyning the output of the means for generating radio-frequency signals of that unit with a signal of said predetermined fixed phase and a frequency which is the difference between said predetermined intermediate frequency to thereby produce an intermediate-frequency second signal component; and, (c) phasing control means for each of said units, each of said phasing control means being coupled to the intermediate-frequency signal component producing means of that unit to produce an output which varies in accordance with differences in phase between said intermediate-frequency first and second signal components, the output of the phasing control means of each unit being coupled to the means for generating radio-frequency signals of that unit to control the frequency of the signals generated by said last-mentioned means to maintain said predetermined phase relationship between the radio-frequency signals radiated by the antenna coupled to that unit and the radio-frequency signal received by that antenna.

4. In a dispersed array of antennas in which each antenna is coupled to a separate unit containing means for transmitting and receiving signals on a predetermied radio frequency, a system for focusing radio-frequency signals radiated by each of the antennas in said array respectively onto the source of a radio-frequency signal, which signal is received by each of the antennas in said array, said system comprising, in combination:

(a) means for generating radio-frequency signals for each of said units, each of said means being coupled to the antenna associated with that unit, the phasing of the output signals of each said means being variable in response to an electrical control signal;

(b) intermediate-frequency signal component producing means for each of said units, each of said signal component producing means being coupled to the antenna associated with that unit for heterodyning said received signal as it appears to the associated antenna with a signal of a predetermined fixed phase and a frequency which is the sum of said predetermined radio frequency and a predetermined intermediate frequency to thereby produce an intermediate-frequency first signal component, and for heterodyning the output of the means for generating radio-frequency signals of that unit with a signal of said predetermined fixed phase and a frequency which is the difference between said predetermined radio frequency and said predetermined intermediate frequency to thereby produce an intermediate-frequency second signal component; and, (c) phasing control means for each of said units, each of said phasing control means intercoupling the intermediate-frequency signal component producing means and the means for generating radio-frequency signals of that unit to produce an electrical output which varies in accordance with differences in phase between the intermediate-frequency first and second signal components produced in that unit, the output of the phasing control means in each of said units being coupled to the means for generating radio-frequency signals of that unit to provide the electrical control signal for said last-mentioned means to maintain the signals radiated by the antenna coupled to that unit in phase conjugate relationship with said received signal as it appeared to that antenna.

5. In a dispersed array of antennas in which each antenna is coupled to a separate unit containing means for transmitting and receiving signals on a predetermined radio-frequency, a system for focusing radio-frequency signals radiated by each of the antennas in said array respectively onto the source of a radio-frequency signal, which signal is received by each of the antennas in said array, said system comprising, in combination:

(a) means for generating radio-frequency signals for each of said units, each of said means being coupled to the antenna associated with that unit, the phasing of the output signals of each said means being variable in response to an electrical control signal;

(b) means for producing a first reference signal of said predetermined radio frequency, the output of said first reference signal producing means being coupled to each of said units;

(c) means for producing a second reference signal of a predetermined intermediate frequency and a predetermined fixed phase with respect to that of said first reference signal, the output of said second reference signal producing means being coupled to each of said units;

(d) signal combining means for each of said units, the input of each of said signal combining means being coupled to the output of said first and second reference signal producing means for that unit, each of said signal combining means producing a first combined signal output of said predetermined fixed phase and a frequency which is the sum of said predetermined radio frequency and said predetermined intermediate frequency, each of said signal combining means further producing a second combined signal output of said predetermined fixed phase and a frequency which is the difference between said predetermined radio frequency and said predetermined intermediate frequency;

(e) first heterodyning means for each of said units, each of said first heterodyning means being coupled to the first output of the signal combining means of that unit and to the antenna associated with that unit to produce an intermediate-frequency first signal component resulting from the heterodyning of said received signal as it appeared to the associated antenna with the first combined signal output of the signal combining means of that unit;

(f) second heterodyning means for each of said units, each of said second heterodyning means being coupled to the second output of the signal combining means of that unit and to the radio frequency generating means of that unit to produce an intermediate-frequency second signal component resulting from the heterodyning of the output produced by the means for generating radio-frequency signals of that unit with the second combined signal output of the signal combining means of that unit;

(g) signal comparing means for each of said units, each of said signal comparing means being coupled to the outputs of the first and second heterodyning means of that unit for producing a phase control electrical signal the magnitude of which varies in accordance with differences in phase between the first and second intermediate frequency signal components in that unit; and, (h) filter means for each of said units, each of said filter means selectively coupling the phase control signal output of the signal comparing means of that unit to the means for generating radio-frequency signals of that unit to provide the electrical control signal therefor to maintain the signals radiated by the antenna coupled to that unit in phase conjugate relationship with said received signal as it appeared to that antenna.

6. The apparatus as set forth in claim 5, wherein said signal combining means comprises a double sideband balanced modulator, each of said first and second heterodyning means comprises a frequency converter, and said signal comparing means comprises a phase discriminator.

7. The apparatus as set forth in claim 4, wherein said intermediate-frequency signal component producing means comprises a double sideband modulator in combination with and first and second frequency converters the upper sideband output of said double sideband modulator being coupled to an input of said first frequency converter, the lower sideband output of said double sideband modulator being coupled to an input of said second frequency converter.

References Cited by the Examiner

UNITED STATES PATENTS 3,166,749 1/1965 Schelleng et al.
3,174,150 3/1965 Sferrazza et al.
3,175,216 3/1965 Enloe.

CHESTER L. JUSTUS, *Primary Examiner.*

H. C. WAMSLEY, *Assistant Examiner.*